US012651498B2

(12) United States Patent　　　　(10) Patent No.: US 12,651,498 B2
Fuke　　　　　　　　　　　　　　　(45) Date of Patent:　　Jun. 9, 2026

(54) VEHICLE CONTROL DEVICE, VEHICLE, VEHICLE CONTROL METHOD AND RECORDING MEDIUM ON WHICH A PROGRAM IS RECORDED

(71) Applicant: TOYOTA JIDOSHA KABUSHIKI KAISHA, Toyota (JP)

(72) Inventor: Jumpei Fuke, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/409,561

(22) Filed: Jan. 10, 2024

(65) Prior Publication Data

US 2024/0144758 A1　　May 2, 2024

Related U.S. Application Data

(63) Continuation of application No. 18/048,118, filed on Oct. 20, 2022.

(30) Foreign Application Priority Data

Dec. 15, 2021　　(JP) ................................. 2021-203598

(51) Int. Cl.
　　　*G07C 9/00*　　　　(2020.01)
　　　*B60R 25/24*　　　(2013.01)
　　　*B60R 25/30*　　　(2013.01)

(52) U.S. Cl.
　　　CPC .......... *G07C 9/00309* (2013.01); *B60R 25/24* (2013.01); *B60R 25/30* (2013.01); *G07C 2009/00507* (2013.01)

(58) Field of Classification Search
None
See application file for complete search history.

(56) References Cited

U.S. PATENT DOCUMENTS 4,672,375 A　　6/1987　Mochida
9,582,949 B2　　2/2017　Brown et al.
　　　　　　　　(Continued)

FOREIGN PATENT DOCUMENTS

JP　　2017-160703 A　　9/2017
JP　　2020-176442 A　　10/2020

OTHER PUBLICATIONS

Office Action mailed Mar. 19, 2024, in co-pending U.S. Appl. No. 18/048,118.

(Continued)

*Primary Examiner* — Carlos Garcia
(74) *Attorney, Agent, or Firm* — Oblon, McClelland, Maier & Neustadt, L.L.P.

(57)　　　　　　　　ABSTRACT

A vehicle control device includes: a receiving section receiving, from a user, setting processing for setting a time period in which control of a vehicle by using an information processing device is suppressed; a detecting section detecting a predetermined user operation for control of the vehicle; and a control permitting section that, in a case in which the predetermined user operation is detected in a time period that is different than the time period in which control of the vehicle is suppressed, permits control of the vehicle in accordance with the information processing device vibrating or moving, and, in a case in which the predetermined user operation is detected within the time period in which control of the vehicle is suppressed, does not permit control of the vehicle regardless of whether or not the information processing device is vibrating or moving.

8 Claims, 10 Drawing Sheets

(56) References Cited

U.S. PATENT DOCUMENTS

| | | | |
|---|---|---|---|
| 9,813,285 B1 | 11/2017 | McGovern et al. | |
| 10,249,121 B2 | 4/2019 | Desinor | |
| 10,894,528 B2 | 1/2021 | Kim et al. | |
| 11,248,549 B2 | 2/2022 | Moro | |
| 11,313,296 B2 | 4/2022 | Hiraoka | |
| 11,686,126 B2 | 6/2023 | Simon | |
| 2004/0223336 A1* | 11/2004 | Murakami | E05B 81/76 |
| | | | 362/501 |
| 2009/0265627 A1 | 10/2009 | Kim et al. | |
| 2009/0280860 A1 | 11/2009 | Dahlke | |
| 2013/0176107 A1* | 7/2013 | Dumas | G07C 9/00571 |
| | | | 340/5.61 |
| 2013/0305319 A1 | 11/2013 | Matthews | |
| 2013/0314269 A1 | 11/2013 | Jansseune | |
| 2013/0317693 A1 | 11/2013 | Jefferies | |
| 2016/0337814 A1* | 11/2016 | Van Wiemeersch | H04W 4/025 |
| 2017/0169641 A1 | 6/2017 | Ziegler | |
| 2017/0294064 A1 | 10/2017 | Desinor | |
| 2018/0188349 A1 | 7/2018 | Lee | |
| 2018/0252794 A1 | 9/2018 | Hermann | |
| 2019/0123893 A1* | 4/2019 | Endo | H04L 67/12 |
| 2019/0184937 A1* | 6/2019 | Endo | B60R 25/24 |
| 2019/0258289 A1 | 8/2019 | Asahara | |
| 2020/0007323 A1 | 1/2020 | Jacob et al. | |
| 2020/0184749 A1 | 6/2020 | Rettig | |
| 2020/0219338 A1 | 7/2020 | Chen et al. | |
| 2020/0351665 A1 | 11/2020 | Kelly | |
| 2021/0017791 A1 | 1/2021 | Simon | |
| 2022/0017043 A1 | 1/2022 | Breynaert | |
| 2022/0198856 A1* | 6/2022 | Sobue | H04W 4/40 |
| 2023/0061183 A1* | 3/2023 | Asai | G07C 9/00309 |
| 2023/0107961 A1 | 4/2023 | Fuke | |
| 2023/0192031 A1 | 6/2023 | Hitotsumatsu | |
| 2024/0310180 A1 | 9/2024 | Akuzawa et al. | |

OTHER PUBLICATIONS

U.S. Office Action issued in U.S. Appl. No. 18/048,118, filed Aug. 20, 2024.

Final Office Action issued in U.S. Appl. No. 18/048,118, filed Dec. 9, 2024.

Notice of Allowance issued in U.S. Appl. No. 18/048,118, filed Sep. 11, 2025.

Office Action issued in U.S. Appl. No. 18/048,118, filed Mar. 20, 2025.

Office Action issued in U.S. Appl. No. 18/048,118, filed Feb. 3, 2026.

* cited by examiner

VEHICLE CONTROL DEVICE, VEHICLE, VEHICLE CONTROL METHOD AND RECORDING MEDIUM ON WHICH A PROGRAM IS RECORDED

CROSS-REFERENCE TO RELATED APPLICATION

This application is a continuation of U.S. application Ser. No. 18/048,118 filed Oct. 20, 2022, which is based on and claims priority under 35 USC 119 from Japanese Patent Application No. 2021-203598 filed on Dec. 15, 2021, the disclosure of which is incorporated by reference herein.

BACKGROUND

Technical Field

The present disclosure relates to a vehicle control device, a vehicle, a vehicle control method, and a program.

Related Art

Japanese Patent Application Laid-Open (JP-A) No. 2017-160703 discloses an electronic key system that, in a case in which vibrating of a smart key is not detected, rejects a verification request from a vehicle. In this electronic key system, a condition for successful authentication is that a portable device has not been stopped for a given time period. Therefore, erroneous operation that is unintentional operation by a user in a case in which the portable device is not moved for a long time, such as when the vehicle or the portable device is being stored, can be prevented.

In a case in which a smartphone in which a digital key is registered has a similar function, because there is the possibility that the smartphone will be used frequently even within a home, there is the concern that the effect of preventing erroneous operation in the same way as with a smart key, will not be able to be obtained.

SUMMARY

In view of the above-described circumstances, an object of the present disclosure is to suppress erroneous operation of an information processing device that is used in order to carry out control of a vehicle.

A first aspect is a vehicle control device including: a receiving section receiving, from a user, setting processing for setting a time period in which control of a vehicle by using an information processing device is suppressed; a detecting section detecting a predetermined user operation for control of the vehicle; and a control permitting section that, in a case in which the predetermined user operation is detected in a time period that is different than the time period in which control of the vehicle is suppressed, permits control of the vehicle in accordance with the information processing device vibrating or moving, and, in a case in which the predetermined user operation is detected within the time period in which control of the vehicle is suppressed, does not permit control of the vehicle regardless of whether or not the information processing device is vibrating or moving.

In the vehicle control device of the first aspect, the receiving section receives, from a user, setting processing for setting a time period in which control of a vehicle by using an information processing device is suppressed. The detecting section detects a predetermined user operation for control of the vehicle. In a case in which the predetermined user operation is detected in a time period that is different than the time period in which control of the vehicle is suppressed, the control permitting section permits control of the vehicle in accordance with the information processing device vibrating or moving. In a case in which the predetermined user operation is detected within the time period in which control of the vehicle is suppressed, the control permitting section does not permit control of the vehicle regardless of whether or not the information processing device is vibrating or moving. In accordance with this vehicle, erroneous operation of an information processing device, which is used in order to carry out control of the vehicle, can be suppressed.

In a vehicle control device of a second aspect, in the vehicle control device of the first aspect, the receiving section receives, from a user, setting processing for setting the time period, for each digital key that is registered in the information processing device.

In the vehicle control device of the second aspect, the receiving section receives, from a user, a setting processing for setting the time period, for each digital key that is registered in the information processing device. In accordance with this vehicle, erroneous operation of the information processing device can be suppressed appropriately per digital key.

In a vehicle control device of a third aspect, the vehicle control device of the second aspect further includes a communication detecting section that detects an information processing device with which communication is possible, wherein the receiving section can receive setting processing for setting the time period, for a digital key that is registered in the detected information processing device with which communication is possible.

In the vehicle control device of the third aspect, the communication detecting section detects an information processing device with which communication is possible. The receiving section receives setting processing for setting the time period, for the digital key that is registered in the detected information processing device with which communication is possible. In accordance with this vehicle, in a case in which it is possible to communicate with an information processing device in which a digital key is registered, a time period in which control of the vehicle is suppressed can be set.

In a vehicle control device of a fourth aspect, in the vehicle control device of any one of the first aspect through the third aspect, in a case in which the predetermined user operation is detected in a time period that is different than the time period in which control of the vehicle is suppressed, the control permitting section does not permit control of the vehicle in accordance with the information processing device not vibrating or moving. In accordance with this vehicle, erroneous operation of an information processing device, which is used in order to carry out control of the vehicle, can be suppressed effectively.

In a vehicle control device of a fifth aspect, the vehicle control device of any one of the first aspect through the third aspect further includes a notification section that, in a case in which the predetermined user operation is detected within the time period in which control of the vehicle is suppressed, gives notice that a current time is within the time period in which control of the vehicle is suppressed.

In the vehicle control device of the fifth aspect, in a case in which the predetermined user operation is detected within the time period in which control of the vehicle is suppressed, the notification section gives notice that the current time is within the time period in which control of the vehicle is suppressed. In accordance with this vehicle, a user, who is attempting to carry out control of the vehicle by using the information processing device, can be notified that the current time is within the time period in which control of the vehicle is suppressed.

In a vehicle control device of a sixth aspect, in the vehicle control device of any one of the first aspect through the fifth aspect, the setting processing is processing for setting either one of enabling or disabling of setting of the time period in which control of the vehicle by using the information processing device is suppressed, as well as a start time and an end time of the time period in which control of the vehicle is suppressed.

A seventh aspect is a vehicle including: the vehicle control device of any one of the first aspect through the sixth aspect; and a door lock device carrying out locking and unlocking of doors.

An eighth aspect is a vehicle control method including: a receiving section receiving, from a user, setting processing for setting a time period in which control of a vehicle by using an information processing device is suppressed; a detecting section detecting a predetermined user operation for control of the vehicle; and a control permitting section permitting control of the vehicle in accordance with the information processing device vibrating or moving, in a case in which the predetermined user operation is detected in a time period that is different than the time period in which control of the vehicle is suppressed, and not permitting control of the vehicle regardless of whether or not the information processing device is vibrating or moving, in a case in which the predetermined user operation is detected within the time period in which control of the vehicle is suppressed.

In the vehicle control method of the eighth aspect, the receiving section receives, from a user, setting processing for setting a time period in which control of a vehicle by using an information processing device is suppressed. The detecting section detects a predetermined user operation for control of the vehicle. In a case in which the predetermined user operation is detected in a time period that is different than the time period in which control of the vehicle is suppressed, the control permitting section permits control of the vehicle in accordance with the information processing device vibrating or moving. In a case in which the predetermined user operation is detected within the time period in which control of the vehicle is suppressed, the control permitting section does not permit control of the vehicle regardless of whether or not the information processing device is vibrating or moving. In accordance with this vehicle control method, erroneous operation of an information processing device, which is used in order to carry out control of the vehicle, can be suppressed.

A ninth aspect is a non-transitory recording medium on which is recorded a program for executable by a computer of a vehicle to perform: receiving, from a user, setting processing for setting a time period in which control of a vehicle by using an information processing device is suppressed; detecting a predetermined user operation for control of the vehicle; in a case in which the predetermined user operation is detected in a time period that is different than the time period in which control of the vehicle is suppressed, permitting control of the vehicle in accordance with the information processing device vibrating or moving; and, in a case in which the predetermined user operation is detected within the time period in which control of the vehicle is suppressed, not permitting control of the vehicle regardless of whether or not the information processing device is vibrating or moving.

In the program, which is recorded on a non-transitory recording medium, of the ninth aspect, the computer receives, from a user, setting processing for setting a time period in which control of the vehicle by using an information processing device is suppressed. The computer detects a predetermined user operation for control of the vehicle. In a case in which the predetermined user operation is detected in a time period that is different than the time period in which control of the vehicle is suppressed, the computer permits control of the vehicle in accordance with the information processing device vibrating or moving. In a case in which the predetermined user operation is detected within the time period in which control of the vehicle is suppressed, the computer does not permit control of the vehicle regardless of whether or not the information processing device is vibrating or moving. In accordance with this program, erroneous operation of an information processing device, which is used in order to carry out control of the vehicle, can be suppressed.

In accordance with the present disclosure, erroneous operation of an information processing device, which is used in order to carry out control of a vehicle, can be suppressed.

BRIEF DESCRIPTION OF THE DRAWINGS

Exemplary embodiments of the present disclosure will be described in detail based on the following figures, wherein.

DETAILED DESCRIPTION

A vehicle system relating to an embodiment of the present disclosure is described by using FIG. 1 through FIG. 10.

[Embodiment of Present Disclosure]

Figure 1:
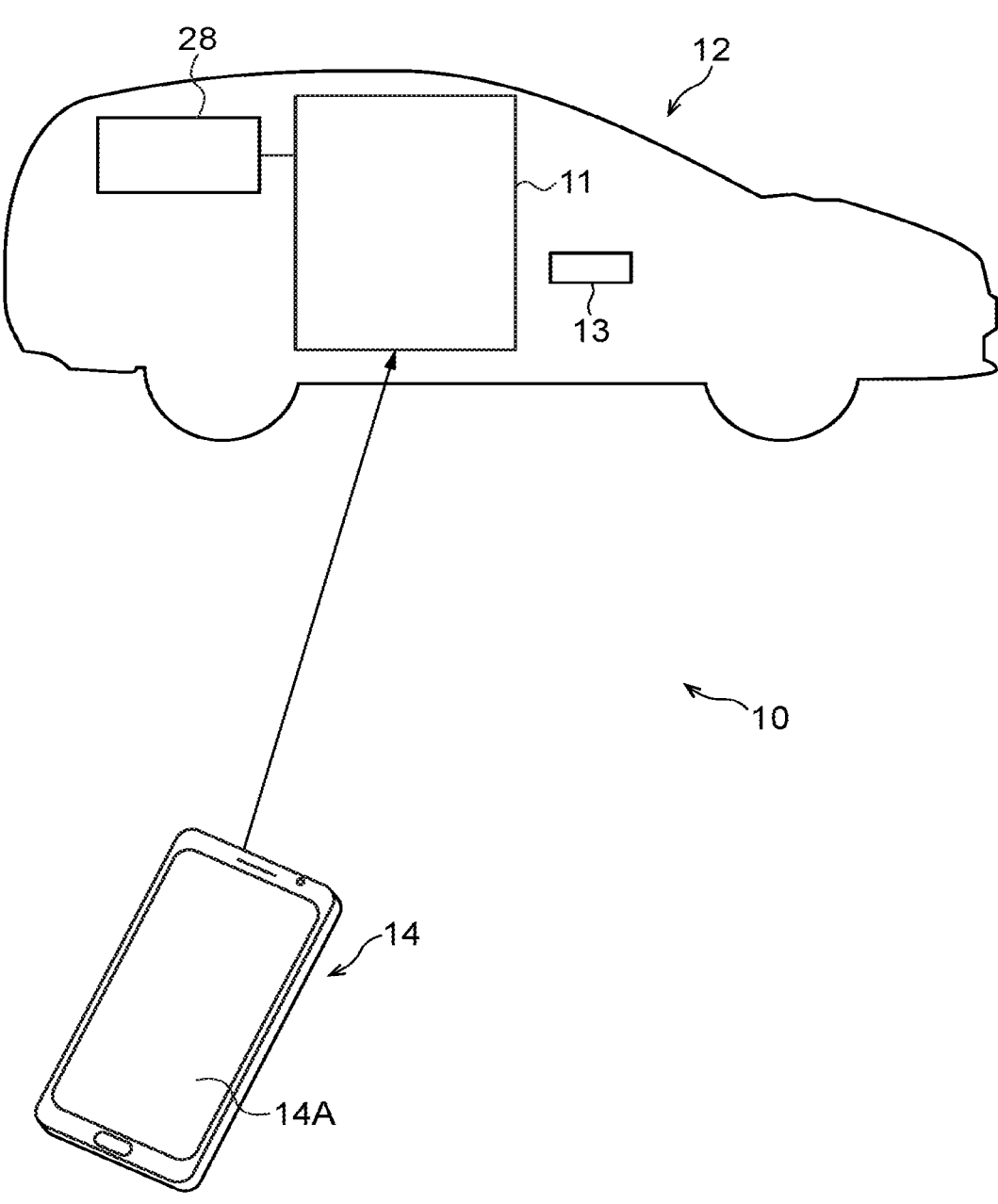
FIG. 1 is a drawing illustrating the schematic structure of a vehicle system relating to a present embodiment.

FIG. 1 is a block drawing illustrating the schematic structure of a vehicle system 10 relating to the present embodiment.

(Overall Structure)

As illustrated in FIG. 1, the vehicle system 10 relating to the present embodiment is structured to include a vehicle 12, and a smartphone 14 that serves as an information processing device for controlling the vehicle 12.

The vehicle 12 is structured so as to be able to directly receive local communications from the smartphone 14 that do not go through a network. These communications include wireless communications and infrared communications.

A door lock device 28 that is installed in the vehicle 12 carries out locking and unlocking of the driver's seat door, the front passenger's seat door, the rear doors and the back door. Locking and unlocking of the respective doors by the door lock device 28 are possible due to a user who holds the smartphone 14 carrying out the operation of touching a door handle 13 and an operation with respect to the smartphone 14.

Figure 2:
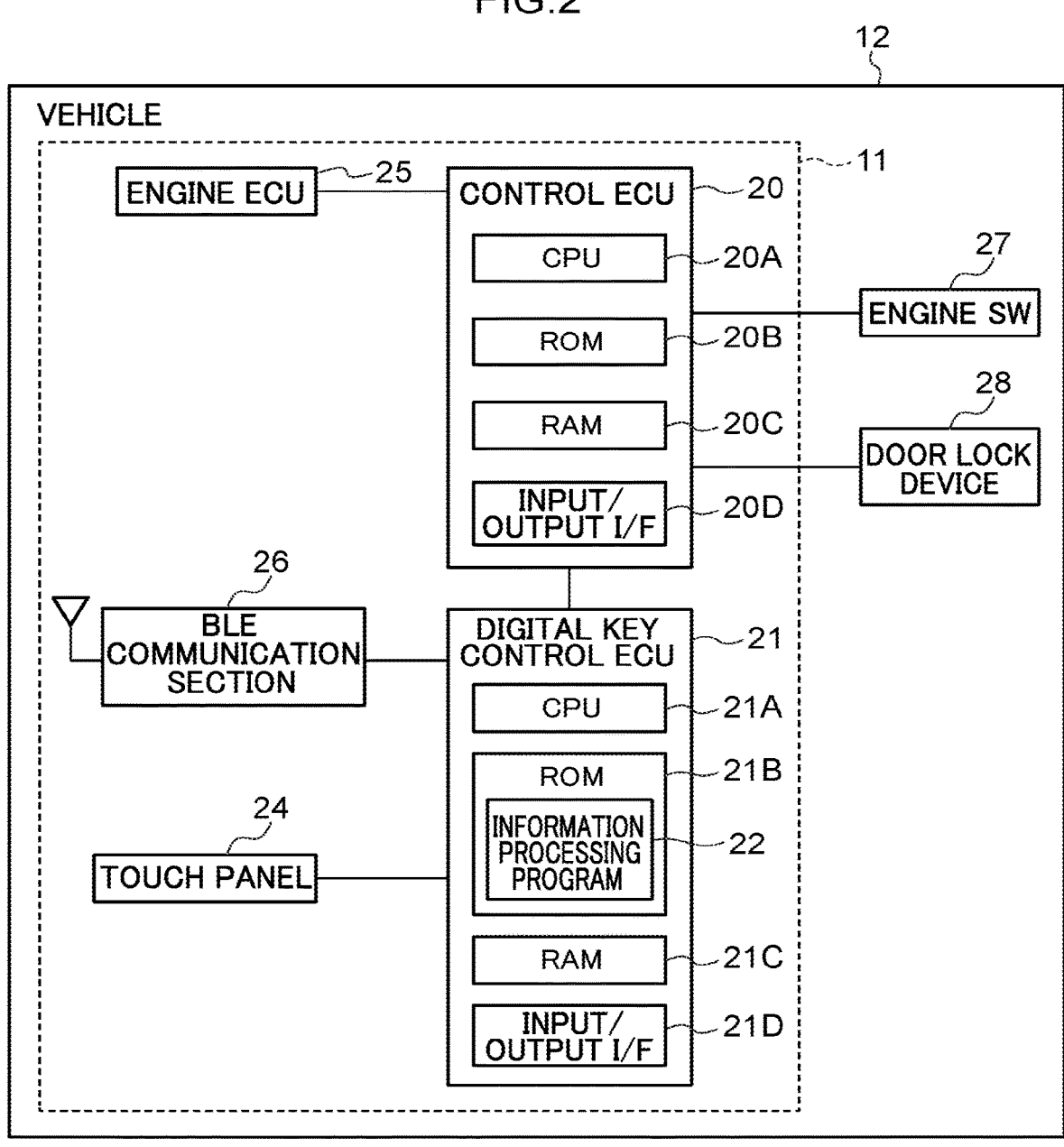
FIG. 2 is a block drawing illustrating hardware structures of a vehicle relating to the present embodiment.

As illustrated in FIG. 2, onboard devices 11 that are installed in the vehicle 12 include a control ECU (Electronic Control Unit) 20, a digital key control ECU 21, a touch panel 24, an engine ECU 25, and a BLE (Bluetooth® Low Energy) communication section 26. The digital key control ECU 21 is an example of the vehicle control device.

The touch panel 24 is provided at, for example, a head unit or an instrument panel or the like, and displays images relating to the current position, the traveling route and advisory information, and receives various inputs.

The engine ECU 25 carries out various types of control of the engine, including starting and stopping of the engine.

The BLE communication section 26 is a communication unit that carries out wireless communications using Bluetooth®, and carries out communication with a BLE communication section 14C that is described later.

The vehicle 12 has an engine switch (SW) 27. The engine SW 27 is a switch for instructing starting and stopping of the engine.

The control ECU 20 is structured to include a CPU (Central Processing Unit) 20A, a ROM (Read Only Memory) 20B, a RAM (Random Access Memory) 20C, and an input/output I/F (Inter Face) 20D. The CPU 20A, the ROM 20B, the RAM 20C and the input/output I/F 20D are connected so as to be able to communicate with one another via an unillustrated internal bus.

The CPU 20A is a central computing processing unit, and executes various programs and controls the respective sections. Namely, the CPU 20A reads-out programs from the ROM 20B, and executes the programs by using the RAM 20C as a workspace.

The ROM 20B stores various programs and various data.

The RAM 20C temporarily stores programs and data as a workspace. The input/output I/F 20D is an interface for communicating with the engine ECU 25, the engine SW 27 and the door lock device 28, respectively.

Note that the control ECU 20 may include, in addition to or in place of the ROM 20B, a storage that serves as the storage section. This storage is structured by, for example, an HDD (Hard Disk Drive) or an SSD (Solid State Drive).

In a case in which verification of the smartphone 14 succeeds, due to the CPU 20A executing a program, the control ECU 20 executes vehicle control including door locking and unlocking by the door lock device 28, turning on of the power source of the vehicle 12, and starting of the engine by the engine ECU 25.

The digital key control ECU 21 is structured to include a CPU 21A that is an example of the processor that is hardware, a ROM 21B, a RAM 21C, and an input/output I/F 21D. The CPU 21A, the ROM 21B, the RAM 21C and the input/output I/F 21D are connected so as to be able to communicate with one another via an unillustrated internal bus. The RAM 21C is an example of the memory.

The respective functions of the CPU 21A, the ROM 21B, the RAM 21C, and the input/output I/F 21D are the same as those of the above-described CPU 20A, ROM 20B, RAM 20C and input/output I/F 20D.

An information processing program 22 for carrying out vehicle control by user operation using a digital key, is stored in the ROM 21B.

The CPU 21A reads-out the information processing program 22 from the ROM 21B, and executes the information processing program 22 by using the RAM 21C as a workspace. The input/output OF 21D is an interface for communicating with the BLE communication section 26.

Note that the digital key control ECU 21 may include, in addition to or in place of the ROM 21B, a storage that serves as the storage section. This storage is structured by, for example, an HDD (Hard Disk Drive) or an SSD (Solid State Drive).

A technique called a relay attack is known in which a smart key that is within a home is erroneously given as a response by using the radio waves from the vehicle as a relay. Most of such cases are cases in which the relay attack is carried out at a parking space of the home during the night. Conventional smart keys have prevented relay attacks by carrying out vibration sensing using a vibration sensor.

Although it is thought that a smartphone in which a digital key is registered also has a similar function, in the case of a smartphone, there is the possibility that the smartphone will always be used within the home as well, and there is the concern that effects similar to those of a smart key will not be able to be obtained. This is because the time over which a smartphone is used within a home is long.

Thus, in the present embodiment, a digital key function prohibiting time period can be set. If the current time is not within this function prohibiting time period, vehicle control is permitted in accordance with the smartphone vibrating. If the current time is within this function prohibiting time period, vehicle control is not permitted, regardless of whether or not the smartphone is vibrating. Further, this digital key function prohibiting time period can be set.

Figure 3:
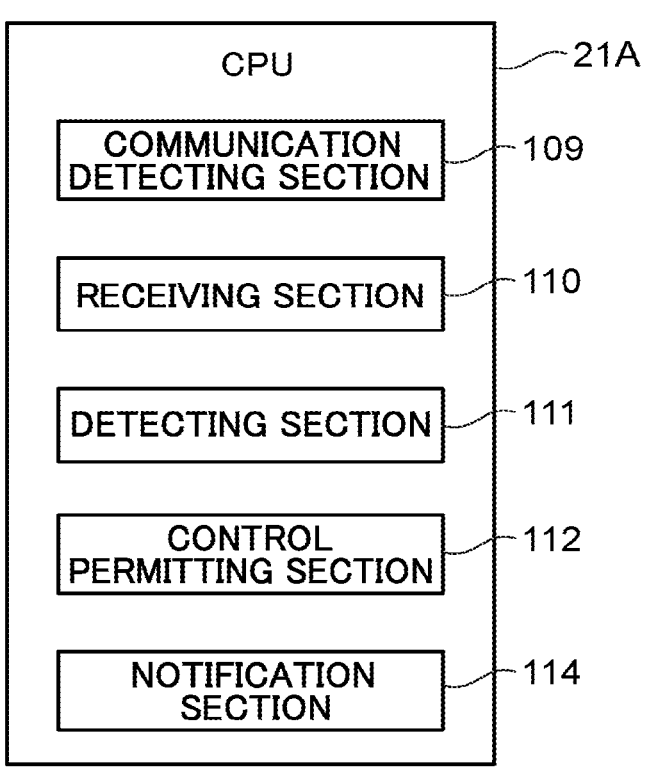
FIG. 3 is a block drawing illustrating an example of functional structures of a CPU of a digital key control ECU at onboard devices of the present embodiment.

Specifically, as illustrated in FIG. 3, due to the CPU 21A executing the information processing program 22, the CPU 21A functions as a communication detecting section 109, a receiving section 110, a detecting section 111, a control permitting section 112, and a notification section 114.

The communication detecting section 109 detects the smartphone 14 that can communicate with the onboard devices 11. For example, on the basis of wireless communication with the smartphone 14 at the BLE communication section 26, the communication detecting section 109 detects the smartphone 14 that exists within the vehicle 12 and with which communication is possible.

The receiving section 110 is structured so as to be able to receive, from a user, a setting processing for setting a digital key function prohibiting time period of a digital key that is registered in the detected smartphone 14 with which communication is possible. Specifically, the receiving section 110 causes the touch panel 24 to display a screen for having the user carry out setting processing for setting the digital key function prohibiting time period for the digital key that is registered in the detected smartphone 14 with which communication is possible.

Figure 4:
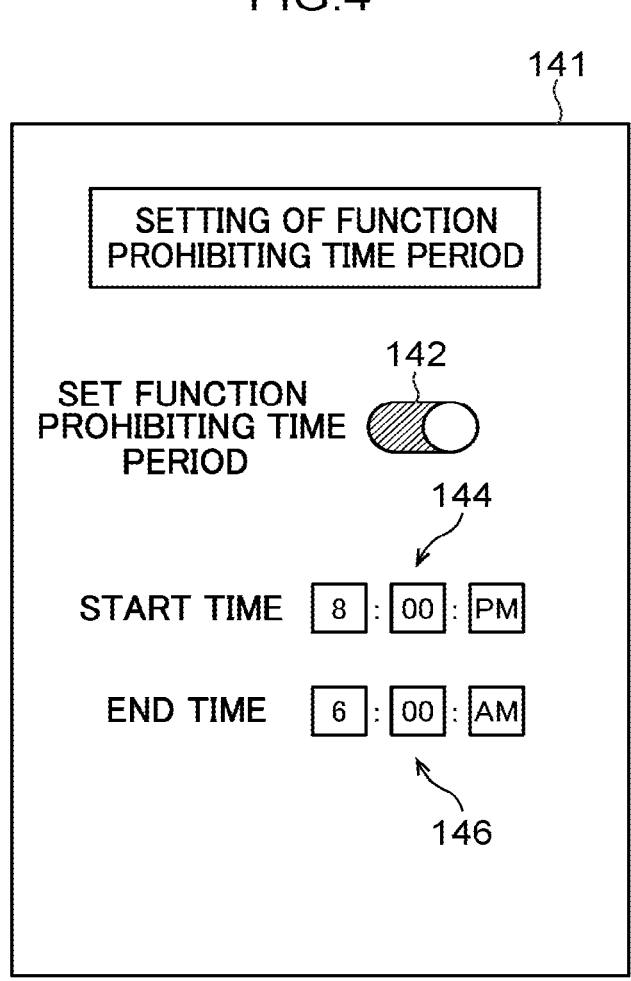
FIG. 4 is a drawing illustrating an example of a screen for setting a digital key function prohibiting time period.

For example, the receiving section 110 causes setting screen 141 illustrated in FIG. 4 to be displayed on a touch panel 14A, and receives either one of enabling or disabling of setting of the digital key function prohibiting time period, as well as the start time and end time of the digital key function prohibiting time period. The setting screen 141 of FIG. 4 includes a button 142 for switching to either one of enabling or disabling of setting the digital key function prohibiting time period, a box 144 for setting the start time of the digital key function prohibiting time period, and a box 146 for setting the end time.

The detecting section 111 detects a predetermined user operation for a control of the vehicle. Here, "control of the vehicle" means a function that controls the vehicle by operation using the smartphone 14, such as locking and unlocking by opening/closing portions, turning the power source on, starting the engine, and the like. For example, the detecting section 111 detects the operation of a user touching the door handle 13 in order to unlock the doors, an operation with respect to the engine SW 27 in order to start the engine, an operation with respect to a power source switch (not illustrated) in order to turn the power source on, and the like.

In a case in which a predetermined user operation for control of the vehicle is detected in a time period that is different than the digital key function prohibiting time period, the control permitting section 112 permits control of the vehicle in accordance with the smartphone 14 vibrating. In a case in which a predetermined user operation is detected within the digital key function prohibiting time period, the control permitting section does not permit control of the vehicle, regardless of whether or not the smartphone 14 is vibrating.

Specifically, at a time when a user attempts to unlock the doors by the operation of touching the door handle 13 during a time period that is different than the digital key function prohibiting time period, on the basis of wireless communication with the smartphone 14 at the BLE communication section 26, the digital key control ECU 21 carries out authentication processing of the digital key by comparing the ID of the digital key registered in the smartphone 14 and ID information that is registered in advance.

More specifically, by the BLE communication section 26, the digital key control ECU 21 transmits a signal expressing a digital key verification request to the smartphone 14, and receives a signal expressing the results of verification from the smartphone 14. At this time, vibration information of the smartphone 14 also is received from the smartphone 14.

Further, in a case in which authentication of the digital key is successful, the digital key control ECU 21 permits control if the vehicle if the received vibration information expresses that the smartphone 14 is vibrating.

Further, in a case in which authentication of the digital key is not successful, or in a case in which the received vibration information expresses that the smartphone 14 is not vibrating, the digital key control ECU 21 does not permit control of the vehicle.

In a case in which a predetermined user operation is detected within the digital key function prohibiting time period, the notification section 114 gives notice that the current time is within the digital key function prohibiting time period.

For example, at the time when a user attempts to unlock the doors by the operation of touching the door handle 13 within the digital key function prohibiting time period, an error sound expressing that the current time is within the digital key function prohibiting time period is emitted.

(Smartphone)

Figure 5:
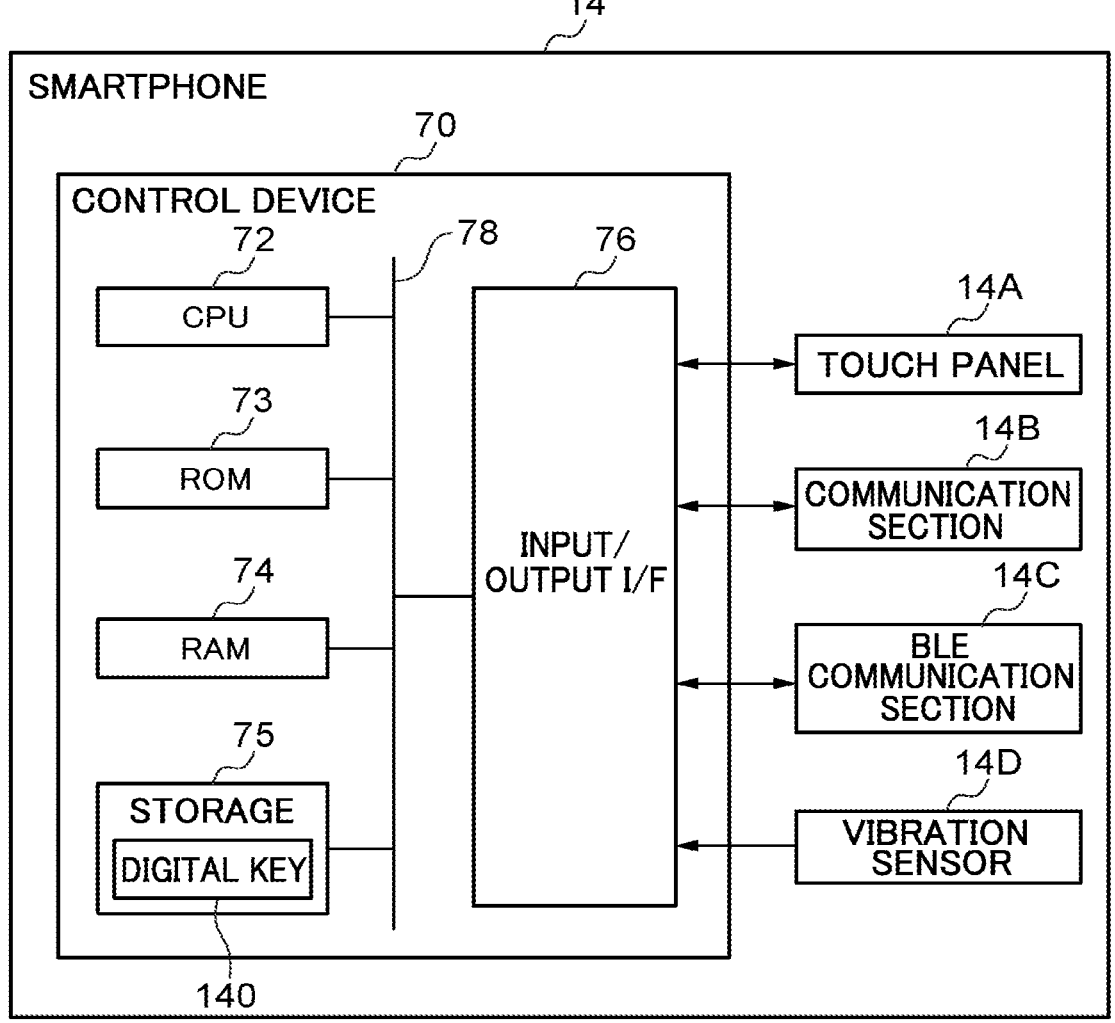
FIG. 5 is a block drawing illustrating hardware structures of a smartphone of the present embodiment.

The smartphone 14 is a communication terminal that a user has. The smartphone 14 of the present embodiment is structured so as to, in a case in which verification of the registered digital key is successful due to communication with the onboard devices 11, receive user operations relating to locking and unlocking of the doors by the door lock device 28, turning the power source of the vehicle 12 on, and starting of the engine respectively, and such that locking and unlocking of the doors by the door lock device 28, turning the power source of the vehicle 12 on, and starting of the engine are possible. As illustrated in FIG. 5, the smartphone 14 is structured to include a control device 70, the touch panel 14A, a communication section 14B, the BLE communication section 14C, and a vibration sensor 14D.

The control device 70 has a CPU 72, a ROM 73, a RAM 74, a storage 75, and an input/output I/F 76. The CPU 72, the ROM 73, the RAM 74, the storage 75, and the input/output I/F 76 are connected so as to be able to communicate with one another via a bus 78.

The respective functions of the CPU 72, the ROM 73, the RAM 74, and the input/output I/F 76 are the same as those of the above-described CPU 20A, ROM 20B, RAM 20C and input/output I/F 20D. Note that, other than the internal storage of the smartphone 14, a micro SD card can be used as the storage 75 of the present embodiment.

Various programs, which include an application program for carrying out vehicle control by user operation using a digital key 140, are stored in the ROM 73.

The CPU 72 reads-out programs from the ROM 73, and executes the programs by using the RAM 74 as a workspace. In the present embodiment, the digital key 140 is registered in the storage 75.

The touch panel 14A, the communication section 14B, the BLE communication section 14C and the vibration sensor 14D are connected to the control device 70 of the present embodiment via the input/output OF 76. Note that the touch panel 14A, the communication section 14B, the BLE communication section 14C and the vibration sensor 14D may be connected directly to the bus 78.

When the application program is executed, the CPU 72 displays icons for locking/unlocking the doors by the door lock device 28, turning the power source of the vehicle 12 on, and starting the engine, respectively, on the touch panel 14A. When the user carries out on operation with respect to an icon, the CPU 72 transmits a signal commanding the vehicle control that corresponds to the operated icon (locking/unlocking the doors by the door lock device 28, turning the power source of the vehicle 12 on, or starting the engine) to the BLE communication section 26 of the onboard devices 11 by the BLE communication section 14C.

In a case in which a signal expressing a verification request of the digital key 140 is received from the vehicle 12, the CPU 72 compares the ID information expressed by the digital key included in the verification request, and the ID of the digital key 140 that is stored in the storage 75. Further, the CPU 72 acquires the amount of vibration detected by the vibration sensor within a past given time period, and, if the amount of vibration is greater than or equal to a threshold value, judges that there is vibration, and, if the amount of vibration is less than the threshold value, judges that there is no vibrating. The CPU 72 transmits the results of verification, and a signal expressing vibration information that expresses the results of judgment of the absence/presence of vibration, to the vehicle 12 by the BLE communication section 14C.

(Flow of Processing)

The flow of processing at the vehicle system 10 of the present embodiment is described next by using the flow-charts of FIG. 6 and FIG. 7.

Figure 6:
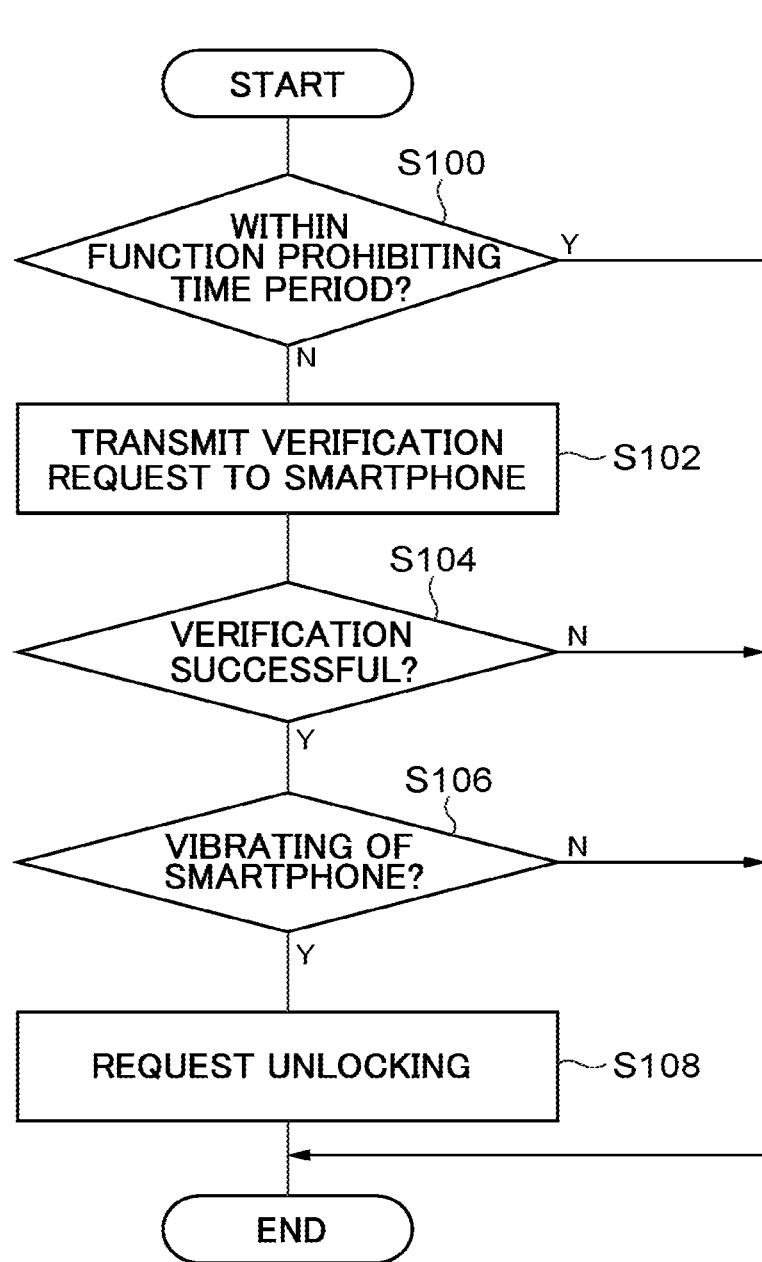
FIG. 6 is a flowchart illustrating an example of the flow of digital key/vehicle control processing that is executed at the CPU of the digital key control ECU at the onboard devices of the present embodiment.

First, in the state in which the BLE communication section 26 of the vehicle 12 and the BLE communication section 14C of the smartphone 14 can communicate, when the detecting section 111 detects a predetermined operation by a user with respect to the vehicle 12, the CPU 21A of the digital key control ECU 21 of the onboard devices 11 executes the information processing program 22, and thereby carries out the digital key/vehicle control processing that is illustrated in FIG. 6. Note that, hereinafter, as an example, a case is described in which the detecting section 111 detects that a user has attempted to unlock the doors by the operation of touching the door handle 13. Further, it is assumed that the receiving section 110 has received, in advance from the user, a setting processing for setting the digital key function prohibiting time period. Further, here-inafter, as an example, a case is described in which setting of the digital key function prohibiting time period is enabled.

First, in step S100, as the control permitting section 112, the CPU 21A judges whether or not the current time is within the digital key function prohibiting time period that has been set. If the current time is within the digital key function prohibiting time period, the CPU 21A judges that verification of the digital key 140 registered in the smart-phone 14 has failed, and ends the digital key/vehicle control processing without permitting unlocking of the doors. On the other hand, if the current time is not within the digital key function prohibiting time period, the CPU 21A moves on to step S102.

In step S102, as the control permitting section 112, the CPU 21A transmits a signal, which expresses a request for verification of the digital key 140, to the BLE communica-tion section 14C of the smartphone 14 by the BLE commu-nication section 26. Here, the signal that expresses a request for verification of the digital key 140 includes ID informa-tion that expresses the ID of the digital key 140 that has been registered in advance at the vehicle 12 side.

Figure 7:
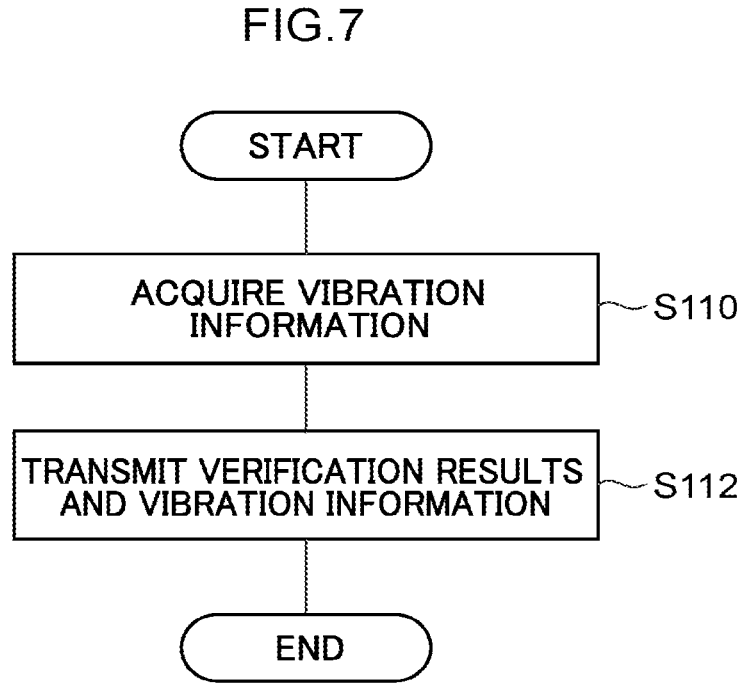
FIG. 7 is a flowchart illustrating an example of the flow of digital key verifying processing that is executed at a CPU of a control device at the smartphone of the present embodiment.

Then, when the signal expressing a request to verify the digital key 140 is received by the BLE communication section 14C of the smartphone 14, the CPU 72 of the control device 70 of the smartphone 14 carries out the digital key verifying processing illustrated in FIG. 7.

In step S110, the CPU 72 acquires time series data of the vibration information that has been detected by the vibration sensor 14D within a past given time period. Then, on the basis of the acquired time series data of the vibration information, the CPU 72 judges whether or not there has been vibrating of the smartphone 14. For example, if the acquired time series data of the vibration information includes vibration information expressing vibration of a given magnitude or greater, the CPU 72 judges that there has been vibrating of the smartphone 14. On the other hand, if the acquired time series data of the vibration information does not include vibration information expressing vibration of a given magnitude or greater, the CPU 72 judges that there has not been vibrating of the smartphone 14.

In step S112, the CPU 72 transmits a signal expressing the results of verification and the vibration information, which expresses the absence/presence of vibrating of the smart-phone 14 that was judged in above-described step S110, to the vehicle 12 by the BLE communication section 14C, and ends the digital key verifying processing. Here, if the ID information, which was included in the signal received from the vehicle 12 and expressing a request to verify the digital key 140, and the ID of the digital key 140 registered in the smartphone 14 match, a signal expressing results of verifi-cation meaning that the verification was successful is trans-mitted to the vehicle 12. On the other hand, if the ID information, which was included in the signal received from the vehicle 12 and expressing a request to verify the digital key 140, and the ID of the digital key 140 registered in the smartphone 14 do not match, a signal expressing results of verification meaning that the verification has failed is trans-mitted to the vehicle 12.

Then, in step S104 of the digital key/vehicle control processing of above-described FIG. 6, the CPU 21A as the control permitting section 112 judges whether or not veri-fication was successful, on the basis of the results of verification received by the BLE communication section 26 from the smartphone 14. If the results of verification received by the BLE communication section 26 from the smartphone 14 express that verification was successful, the routine moves on to step S106. On the other hand, if the results of verification received by the BLE communication section 26 from the smartphone 14 express that verification failed, the digital key/vehicle control processing is ended without permitting unlocking of the doors.

In step S106, as the control permitting section 112, the CPU 21A judges whether or not a signal expressing that there is vibration has been received by the BLE communi-cation section 26 from the smartphone 14. If a signal expressing that there is vibration has been received by the BLE communication section 26 from the smartphone 14, the routine moves on to step S108. On the other hand, if a signal expressing that there is no vibration has been received by the BLE communication section 26 from the smartphone 14, the digital key/vehicle control processing is ended without per-mitting unlocking of the doors.

In step S108, as the control permitting section 112, the CPU 21A requests the control ECU 20 to unlock the doors, and ends the digital key/vehicle control processing. Then, the control ECU 20 effects control so as to lock the respec-tive doors by the door lock device 28.

Figure 8:
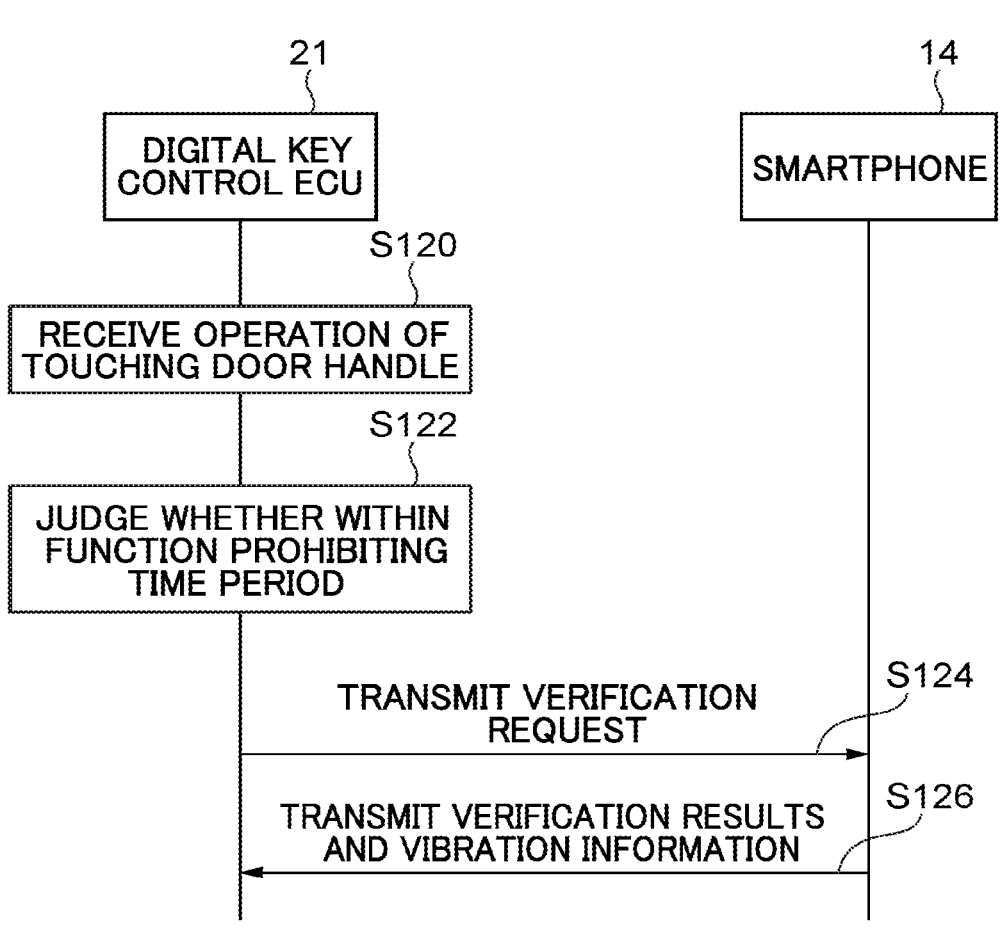
FIG. 8 is a sequence drawing illustrating an example of the flow of processings at the vehicle system of the present embodiment.

An example of the flow of processings in a case in which the above-described digital key/vehicle control processing and digital key verifying processing are executed is described by using the sequence drawing of FIG. 8. In FIG. 8, as an example, a case is described in which the operation of a user, who is outside of the vehicle 12, touching the door handle 13 is carried out as the operation of unlocking the doors of the vehicle 12, and the current time is within the digital key function prohibiting time period.

First, in step S120, the digital key control ECU 21 receives, as an operation of unlocking the doors of the vehicle 12, the operation of a user at the exterior of the vehicle 12 touching the door handle 13.

Then, in step S122, the digital key control ECU 21 judges whether or not the current time is within the digital key function prohibiting time period. In step S124, the digital key control ECU 21 transmits a signal expressing a request to verify the digital key 140, to the BLE communication section 14C of the smartphone 14 by the BLE communica-tion section 26.

Then, in step S126, the smartphone 14 transmits a signal, which expresses the results of verification of the digital key 140 and the vibration information, to the vehicle 12 by the BLE communication section 14C. If the vibration informa-tion expresses that there is no vibration of the smartphone 14, the digital key control ECU 21 does not unlock the doors of the vehicle 12. On the other hand, if it is judged that the vibration information expresses that there is vibrating of the smartphone 14, the digital key control ECU 21 unlocks the doors of the vehicle 12.

(Overview of Present Embodiment)

At the vehicle 12 of the present embodiment, a digital key function prohibiting time period can be set. If a predetermined user operation is detected within the digital key function prohibiting time period, control of the vehicle is not permitted regardless of whether or not the smartphone 14 is vibrating. Due thereto, erroneous operation (e.g., relay attacks) of the smartphone that is used in order to carry out control of the vehicle can be suppressed.

Further, from the standpoint of security and in order to suppress erroneous operation of a smartphone in which a digital key is registered, it can be made such that control of the vehicle by using that smartphone is not permitted during an arbitrary time range set by the user.

Further, in a case in which a digital key function prohibiting time period is set, when a predetermined user operation is detected, if the current time is within the digital key function prohibiting time period, it is always judged that verification of the digital key has failed, and it can thereby be made such that the vehicle cannot be unlocked by a digital key.

Modified Example

Note that the present embodiment describes the example of a case in which, in the digital key/vehicle control processing, after it is judged whether or not the current time is within the digital key function prohibiting time period, it is judged whether or not there is vibration of the smartphone 14. However, the present disclosure is not limited to this. In the digital key/vehicle control processing, after it is judged whether or not there is vibration of the smartphone 14, it may be judged whether or not the current time is within the digital key function prohibiting time period.

Figure 9:
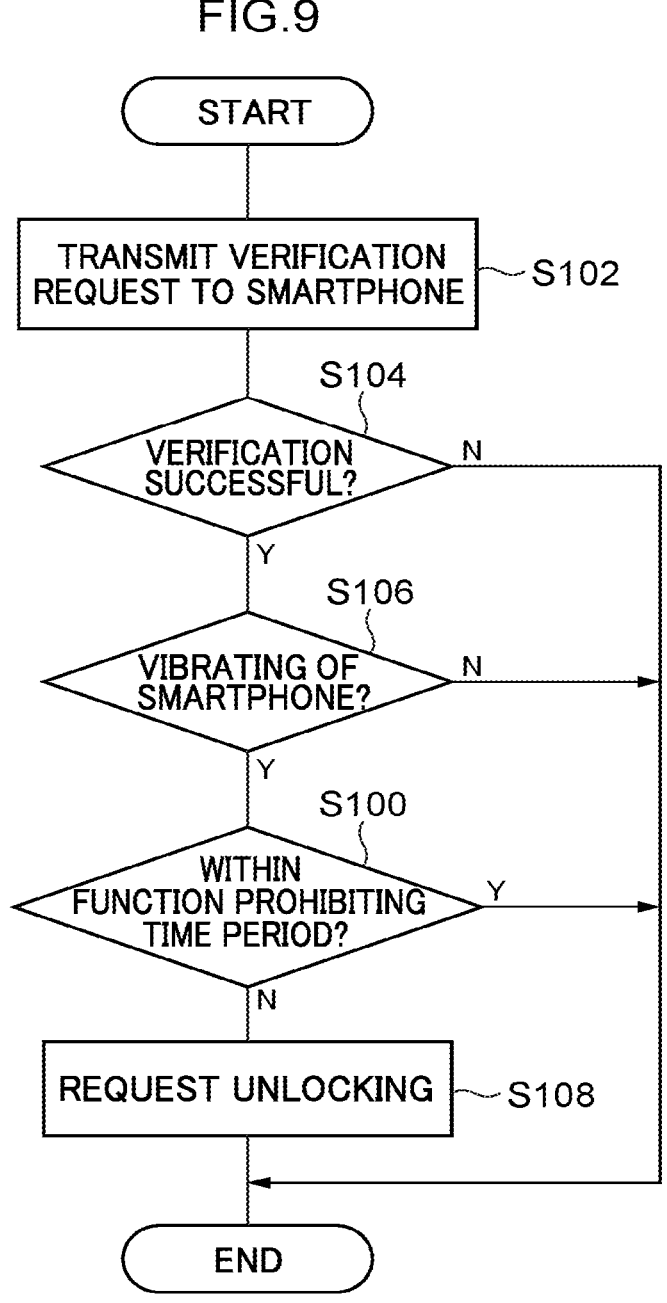
FIG. 9 is a flowchart illustrating an example of the flow of digital key/vehicle control processing that is executed at the CPU of the digital key control ECU at the onboard devices of a modified example of the present embodiment.

For example, the CPU 21A of the digital key control ECU 21 of the onboard devices 11 carries out the digital key/vehicle control processing illustrated in FIG. 9 by executing the information processing program 22. Note that processings that are similar to those of the above-described embodiment are denoted by the same reference numerals, and detailed description thereof is omitted.

First, in step S102, the CPU 21A as the control permitting section 112 transmits a signal, which expresses a request for verification of the digital key 140, to the BLE communication section 14C of the smartphone 14 by the BLE communication section 26.

Then, when the signal expressing a request to verify the digital key 140 is received by the BLE communication section 14C of the smartphone 14, the CPU 72 of the control device 70 of the smartphone 14 carries out the digital key verifying processing illustrated in above-described FIG. 7.

Then, in step S104, the CPU 21A as the control permitting section 112 judges whether or not verification was successful, on the basis of the results of verification received by the BLE communication section 26 from the smartphone 14. If the results of verification received by the BLE communication section 26 from the smartphone 14 express that verification was successful, the routine moves on to step S106. On the other hand, if the results of verification received by the BLE communication section 26 from the smartphone 14 express that verification failed, the digital key/vehicle control processing is ended without permitting unlocking of the doors.

In step S106, as the control permitting section 112, the CPU 21A judges whether or not a signal expressing that there is vibration has been received by the BLE communication section 26 from the smartphone 14. If a signal expressing that there is vibration has been received by the BLE communication section 26 from the smartphone 14, the routine moves on to step S100. On the other hand, if a signal expressing that there is no vibration has been received by the BLE communication section 26 from the smartphone 14, the digital key/vehicle control processing is ended without permitting unlocking of the doors.

In step S100, as the control permitting section 112, the CPU 21A judges whether or not the current time is within the digital key function prohibiting time period that has been set. If the current time is within the digital key function prohibiting time period, the CPU 21A judges that verification of the digital key 140 registered in the smartphone 14 has failed, and ends the digital key/vehicle control processing without permitting unlocking of the doors. On the other hand, if the current time is not within the digital key function prohibiting time period, the CPU 21A moves on to step S108.

In step S108, as the control permitting section 112, the CPU 21A requests the control ECU 20 to unlock the doors, and ends the digital key/vehicle control processing. Then, the control ECU 20 effects control so as to lock the respective doors by the door lock device 28.

[Notes]

Although the above embodiment describes, as an example, a case in which a digital key function prohibiting time period is set, the present disclosure is not limited to this. For example, a digital key function permitting time period may be set. In this case, in a case in which a predetermined user operation for control of the vehicle is detected within the digital key function permitting time period, the control permitting section 112 permits control of the vehicle in accordance with the smartphone 14 vibrating, and, in a case in which a predetermined user operation is detected at a time that is not within the digital key function permitting time period, control of the vehicle is not permitted regardless of whether or not the smartphone 14 is vibrating.

Further, the receiving section 110 receives the setting processing, which is for setting the digital key function permitting time period, from the user. Specifically, the receiving section 110 causes the touch panel 24 to display a screen for having the user carry out setting processing for setting the digital key function permitting time period.

Figure 10:
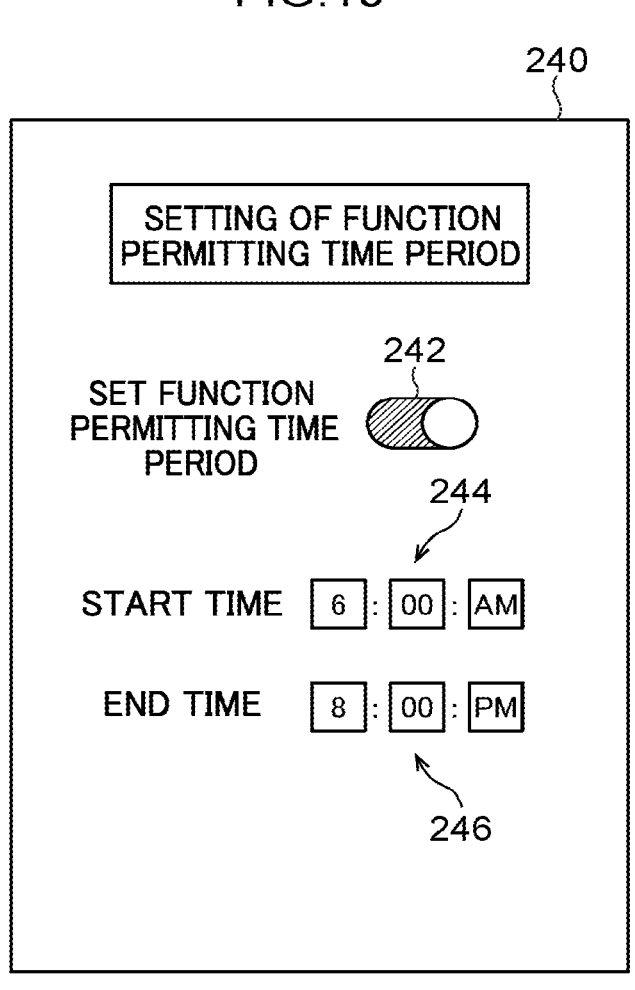
FIG. 10 is a drawing illustrating an example of a screen for setting a digital key function permitting time period.

For example, the receiving section 110 causes a setting screen 240 illustrated in FIG. 10 to be displayed on the touch panel 24, and receives either one of enabling or disabling setting of the digital key function permitting time period, as well as the start time and end time of the digital key function permitting time period. The setting screen 240 of FIG. 10 includes a button 242 for switching to either one of enabling or disabling setting of the digital key function permitting time period, a box 244 for setting the start time of the digital key function permitting time period, and a box 246 for setting the end time.

Further, the present embodiment describes, as an example, a case in which, in a case in which a predetermined user operation for control of the vehicle is detected in a time period that is different than the digital key function prohibiting time period, the onboard devices 11 permit control of the vehicle in accordance with the smartphone 14 vibrating, and, in a case in which a predetermined user operation is detected within the digital key function prohibiting time period, the onboard devices 11 do not permit control of the vehicle regardless of whether or not the smartphone 14 is vibrating. However, the present disclosure is not limited to this. For example, in a case in which a predetermined user operation for control of the vehicle is detected in a time period that is different than the digital key function prohibiting time period, the onboard devices 11 may permit control of the vehicle in accordance with the smartphone 14 moving, and, in a case in which a predetermined user operation is detected within the digital key function prohibiting time period, the onboard devices 11 may not permit control of the vehicle regardless of whether or not the smartphone 14 is moving. For example, it can be thought that the smartphone 14 is moving in a case in which the amount of change in the intensity of the radio waves emitted from the vehicle 12 to the smartphone 14 is greater than or equal to a threshold value. On the other hand, it can be thought that the smartphone 14 is not moving in a case in which the amount of change in the intensity of the radio waves emitted from the vehicle 12 to the smartphone 14 is less than the threshold value.

Further, the present embodiment describes an example of a case in which, at the time when a user attempts to unlock the doors by the operation of touching the door handle 13, the onboard devices 11 judge whether or not the current time is within the digital key function prohibiting time period. However, the present disclosure is not limited to this. For example, the onboard devices 11 may judge whether or not the current time is within the digital key function prohibiting time period, at the time when a user attempts to start the engine by an operation with respect to the engine SW 27.

Moreover, a digital key function prohibiting time period may be set for each of the digital keys 140 that are registered in the respective smartphones 14. In this case, it suffices for the receiving section 110 to receive setting processing for setting the digital key function prohibiting time period for the digital key 140 that is registered in the smartphone 14 with which communication is possible and which is detected by the communication detecting section 109. Further, at the time when a predetermined user operation is detected by the detecting section 111, it suffices for the control permitting section 112 to judge whether or not the current time is within the digital key function prohibiting time period that has been set for the digital key 140 that is registered in the smartphone 14 with which communication is possible and which has been detected by communication detecting section 109.

Further, the digital key function prohibiting time period may be set per predetermined user operation. In this case, it suffices for the receiving section 110 to receive setting processing for setting the digital key function prohibiting time period per predetermined user operation. Further, at the time when a predetermined user operation is detected by the detecting section 111, it suffices for the control permitting section 112 to judge whether or not the current time is within the digital key function prohibiting time period that has been set for the predetermined user operation that is detected.

Moreover, the above respective embodiments describe, as examples, cases in which the onboard devices 11 have the control ECU 20 and the digital key control ECU 21, respectively. However, the present disclosure is not limited to this, and the control ECU 20 and the digital key control ECU 21 may be structured as a single ECU.

In the above respective embodiments, the information processing device in which the digital key is registered is the smartphone 14. However, the present disclosure is not limited to this, and the digital key 140 may be registered in a device that has a communication function, such as a tablet computer, a wearable computer, or the like.

Further, the above respective embodiments describe examples of cases in which the smartphone 14 carries out wireless communications with the onboard devices 11 by using Bluetooth®. However, the present disclosure is not limited to this. For example, the smartphone 14 may carry out wireless communications with the onboard devices 11 by using NFC or UWB.

The above embodiments describe, as examples, cases in which the vehicle 12 is a vehicle driven by operating an engine by using gasoline as the motive power. However, the present disclosure is not limited to this. The vehicle 12 may be an electric vehicle such as an HEV (Hybrid Electric Vehicle), a PHEV (Plug-in Hybrid Electric Vehicle), an FCEV (Fuel Cell Electric Vehicle), a BEV (Battery Electric Vehicle) or the like.

Note that any of various types of processors other than a CPU may execute the various processings that are executed due to the CPU 21A reading-in software (a program) in the above-described embodiments. Examples of processors in this case include PLDs (Programmable Logic Devices) whose circuit structure can be changed after production such as FPGAs (Field-Programmable Gate Arrays) and the like, and dedicated electrical circuits that are processors having circuit structures that are designed for the sole purpose of executing specific processings such as ASICs (Application Specific Integrated Circuits) and the like, and the like. Further, the various processings may be executed by one of these various types of processors, or may be executed by a combination of two or more of the same type or different types of processors (e.g., plural FPGAs, or a combination of a CPU and an FPGA, or the like). Further, the hardware structures of these various types of processors are, more specifically, electrical circuits that combine circuit elements such as semiconductor elements and the like.

Further, the above embodiments describe forms in which the respective programs are stored in advance (are installed) in a computer-readable, non-transitory recording medium. For example, at the onboard devices 11, the information processing program 22 is stored in advance in the ROM 21B. However, the present disclosure is not limited to this. The respective programs may be provided in forms of being recorded in a non-transitory recording medium such as a CD-ROM (Compact Disc Read Only Memory), a DVD-ROM (Digital Versatile Disc Read Only Memory), a USB (Universal Serial Bus) memory, or the like. Further, the respective programs may be in a form of being downloaded from an external device over a network.

The flows of the processings described in the above embodiments also are examples, and unnecessary steps may be deleted therefrom, new steps may be added thereto, or the order of processings may be rearranged, within a scope that does not depart from the gist of the present disclosure.

The respective structures of the respective onboard devices, the smartphone, the physical key, and the managing server that are described in the above embodiments are examples, and may be changed in accordance with the situation, within a scope that does not depart from the gist of the present disclosure.

What is claimed is:

1. A vehicle control device mounted at a vehicle, the vehicle control device comprising:

at least one processor, wherein the at least one processor is configured to:

receive setting processing for setting a time period in which control of the vehicle by using an information processing device is suppressed;

judge whether or not a predetermined user operation for control of the vehicle is detected;

in a case in which it is judged that the predetermined user operation is detected in a time period that is different than the time period in which control of the vehicle is suppressed and a verification of the information processing device is successful, permit control of the vehicle in accordance with the predetermined user operation; and in a case in which it is judged that the predetermined user operation is detected within the time period in which control of the vehicle is suppressed, not permit control of the vehicle in accordance with the predetermined user operation, wherein the at least one processor receives, from a user, the setting processing for setting the time period, for each digital key that is registered in the information processing device in a case in which a plurality of digital keys are registered in the information processing device, wherein the predetermined user operation is unlocking a door of the vehicle by touching a door handle, wherein the at least one processor is configured to further detect the information processing device with which communication is possible, wherein the at least one processor can receive setting processing for setting the time period, for a digital key that is registered in the detected information processing device with which communication is possible, from the detected information processing device when the information processing device with which communication is possible is detected, and wherein the at least one processor is configured to receive, from the user, setting processing for setting the time period, for each predetermined user operation which are different from each other.

2. The vehicle control device of claim 1, wherein the at least one processor is configured to:

in a case in which it is judged that the predetermined user operation is detected in a time period that is different than the time period in which control of the vehicle is suppressed, permit control of the vehicle in accordance with the information processing device vibrating or moving; and in a case in which it is judged that the predetermined user operation is detected within the time period in which control of the vehicle is suppressed, not permit control of the vehicle regardless of whether or not the information processing device is vibrating or moving.

3. The vehicle control device of claim 2, wherein, in a case in which it is judged that the predetermined user operation is detected in a time period that is different than the time period in which control of the vehicle is suppressed, the at least one processor does not permit control of the vehicle in accordance with the information processing device not vibrating or moving.

4. The vehicle control device of claim 1, wherein the at least one processor is configured to, in a case in which it is judged that the predetermined user operation is detected within the time period in which control of the vehicle is suppressed, further give notice that a current time is within the time period in which control of the vehicle is suppressed.

5. The vehicle control device of claim 1, wherein the setting processing is processing for setting either one of enabling or disabling of setting of the time period in which control of the vehicle by using the information processing device is suppressed, as well as a start time and an end time of the time period in which control of the vehicle is suppressed.

6. A vehicle comprising:

the vehicle control device of claim 1; and a door lock device carrying out locking and unlocking of doors.

7. A vehicle control method comprising:

by a computer, receiving setting processing for setting a time period in which control of a vehicle by using an information processing device is suppressed;

judging whether or not a predetermined user operation for control of the vehicle is detected;

permitting control of the vehicle in accordance with the predetermined user operation, in a case in which it is judged that the predetermined user operation is detected in a time period that is different than the time period in which control of the vehicle is suppressed and a verification of the information processing device is successful; and not permitting control of the vehicle in accordance with the predetermined user operation, in a case in which it is judged that the predetermined user operation is detected within the time period in which control of the vehicle is suppressed, wherein receiving, from a user, the setting processing for setting the time period, for each digital key that is registered in the information processing device in a case in which a plurality of digital keys are registered in the information processing device, wherein the predetermined user operation is unlocking a door of the vehicle by touching a door handle, and wherein the method further comprises detecting the information processing device with which communication is possible, receiving setting processing for setting the time period, for a digital key that is registered in the detected information processing device with which communication is possible, from the detected information processing device when the information processing device with which communication is possible is detected, and receiving, from the user, setting processing for setting the time period, for each predetermined user operation which are different from each other.

8. A non-transitory recording medium on which is recorded a program executable by a computer of a vehicle to perform:

receiving setting processing for setting a time period in which control of a vehicle by using an information processing device is suppressed;

judging whether or not a predetermined user operation for control of the vehicle is detected;

in a case in which it is determined the predetermined user operation is detected in a time period that is different than the time period in which control of the vehicle is suppressed and a verification of the information processing device is successful, permitting control of the vehicle in accordance with the predetermined user operation; and in a case in which it is judged that the predetermined user operation is detected within the time period in which control of the vehicle is suppressed, not permitting control of the vehicle in accordance with the predetermined user operation, wherein receiving, from a user, the setting processing for setting the time period, for each digital key that is registered in the information processing device in a case in which a plurality of digital keys are registered in the information processing device, wherein the predetermined user operation is unlocking a door of the vehicle by touching a door handle, and wherein the program executable by the computer of the vehicle further performs detecting the information processing device with which communication is possible, and receiving setting processing for setting the time period, for a digital key that is registered in the detected information processing device with which communication is possible, from the detected information processing device when the information processing device with which communication is possible is detected, and receiving, from the user, setting processing for setting the time period, for each predetermined user operation which are different from each other.

\* \* \* \* \*